US011803335B2

(12) United States Patent
Chandrasekaran et al.

(10) Patent No.: US 11,803,335 B2
(45) Date of Patent: Oct. 31, 2023

(54) DATA PIPELINE AND ACCESS ACROSS MULTIPLE MACHINE LEARNED MODELS

(71) Applicant: ITERATE STUDIO, INC., Highlands Ranch, CO (US)

(72) Inventors: Arulkumaran Chandrasekaran, Tamilnadu (IN); Brainerd Sathianathan, Morgan Hill, CA (US)

(73) Assignee: ITERATE STUDIO, INC., Highlands Ranch, CO (US)

( * ) Notice: Subject to any disclaimer, the term of this patent is extended or adjusted under 35 U.S.C. 154(b) by 0 days.

(21) Appl. No.: 17/837,806

(22) Filed: Jun. 10, 2022

(65) Prior Publication Data

US 2022/0398044 A1 Dec. 15, 2022

Related U.S. Application Data

(60) Provisional application No. 63/209,696, filed on Jun. 11, 2021.

(51) Int. Cl.
*G06F 3/06* (2006.01)
*G06F 8/51* (2018.01)

(52) U.S. Cl.
CPC .......... *G06F 3/0659* (2013.01); *G06F 3/0608* (2013.01); *G06F 3/0673* (2013.01); *G06F 8/51* (2013.01)

(58) Field of Classification Search
None
See application file for complete search history.

(56) References Cited

U.S. PATENT DOCUMENTS

| 2011/0307422 | A1 | 12/2011 | Drucker et al. |
| 2012/0226639 | A1 | 9/2012 | Burdick et al. |
| 2012/0306648 | A1* | 12/2012 | Karaffa .............. G05B 19/409 340/540 |
| 2014/0164377 | A1* | 6/2014 | Kanabar .............. G06F 16/258 707/737 |
| 2015/0149498 | A1 | 5/2015 | Agarwal et al. |

(Continued)

OTHER PUBLICATIONS

PCT International Search Report and Written Opinion, dated Oct. 14, 2022, for PCT Application No. PCT/US2022/033075, 13 pages.

*Primary Examiner* — Charles Rones
*Assistant Examiner* — Jonah C Krieger
(74) *Attorney, Agent, or Firm* — Dorsey & Whitney LLP

(57) ABSTRACT

The present disclosure describes systems and methods for storing incoming data and providing access to that data to multiple machine learned models in a data type-agnostic and programming language-agnostic manner. Operationally, a computing device may receive in coming data (e.g., from sensors, etc.). The computing device may store the incoming data in memory blocks, and index the memory blocks with a unique index (e.g., tag). The index may correspond to a determined tier for the memory blocks, and may enable the system to both locate the data once stored and enable the system to read (or use) the data upon receiving, for example, a data access request. In this way, systems and methods described herein provide for a robust data access and transfer mechanism that allows data to be stored a single time, but accessed by one or more different applications, machine learned models, and the like, simultaneously.

17 Claims, 5 Drawing Sheets

(56) References Cited

U.S. PATENT DOCUMENTS

| | | |
|---|---|---|
| 2015/0161188 A1* | 6/2015 | Eng .................. G06F 9/541 |
| | | 707/756 |
| 2015/0170055 A1 | 6/2015 | Beymer et al. |
| 2016/0012350 A1 | 1/2016 | Narayanan et al. |
| 2019/0121889 A1* | 4/2019 | Gold .................. G06F 3/061 |
| 2021/0097439 A1* | 4/2021 | Vodencarevic ........... G06F 8/71 |
| 2021/0182357 A1* | 6/2021 | Partee .................. G06N 3/08 |
| 2022/0166624 A1* | 5/2022 | Seraj .................. G06N 5/04 |
| 2022/0269903 A1* | 8/2022 | Nagarajegowda .... G06F 3/0629 |

* cited by examiner

DATA PIPELINE AND ACCESS ACROSS MULTIPLE MACHINE LEARNED MODELS

CROSS-REFERENCE TO RELATED APPLICATIONS

This application claims the benefit of priority pursuant to 35 U.S.C. 119(e) of U.S. Provisional Patent Application No. 63/209,696, filed Jun. 11, 2021, titled "Data Pipeline and Access Across Multiple Machine Learned Models," which is hereby incorporated by reference herein in its entirety.

FIELD

The present disclosure relates generally to systems and methods for utilizing data for machine learned models.

BACKGROUND

Machine learning (ML) (e.g., artificial intelligence (AI)) enables a system, engine, or the like to learn from data rather than using explicit or hardcoded programming. For example, ML algorithms use computational methods and data analytic techniques to learn information directly from data without relying on a predetermined equation as a model. Operationally, ML algorithms ingest (or learn from) training data over time, and subsequently generate a predictive and precise ML model based on that data. After training, when provided with new data (often termed evaluation or scoring data), the generated ML model may provide a predictive output. In many instances, generated ML models adaptively improve their predictive performance over time, as the quantity of data available for training and/or learning increases. In other words, more training data oftentimes leads to increased predictive accuracy.

As the prevalence of ML models and their implementation into products and services increases, so too, in many cases, does the need for multiple different ML models to each require similar data in order to further train and/or to predict various outputs. For example, a self-driving car may include a first and a second ML model, each configured to use certain data to predict certain outputs. More specifically, a first ML model written in a first language of that self-driving car may require data to train on and subsequently predict weather conditions, while a second ML model written in a second programming language of that self-driving car may require data, which may be similar to the first ML data, to train on and subsequently predict safety conditions.

There currently exists a gap to efficiently store incoming data that may be used to train and evaluate multiple machine learned models due to memory limit constraints, as well as to enable the communication of, or provide access to, that incoming data through data pipelines.

Accordingly, it may be desirable to facilitate the efficient storage and communication of data across multiple machine learned models.

SUMMARY

The present application includes a computer implemented method for storing incoming data and providing access to that data to multiple machine learned models in a data type-agnostic and programming language-agnostic manner. The method includes receiving a plurality of incoming data, where each of the plurality of data includes a corresponding data type; mapping, based at least in part on one or more configurable parameters, each data of the plurality of incoming data to a corresponding memory block; storing, based at least in part on the one or more configurable parameters, each memory block to a storage location of a plurality of storage locations; in response to receiving a first access request to access a first memory block in a first programming language from a first machine learned model, providing access to the first memory block, wherein access to the first memory block is provided to the first machine learned model in the first programming language; and in response to receiving a second access request to access a second memory block in a second programming language from a second machine learned model, providing access to the second memory block, wherein access to the second memory block is provided to the second machine learned model in the second programming language.

Additionally, a system is disclosed. The system includes storage, comprising local physical memory storage, network storage, distributed storage, disk storage, or combinations thereof; and a computing device, comprising an application layer running one or more machine learned models, a mapping layer, a memory layer, and a processor, wherein the processor is communicatively coupled to the mapping layer and in communication with the storage, the application layer, and the memory layer, and configured to: map, based at least in part on one or more configurable parameters, each data of a plurality of incoming data to a corresponding memory block; store, based at least in part on the one or more configurable parameters, each memory block to a storage location of the storage; in response to receiving a first access request in a first programming language to access a first memory block from a first machine learned model of the one or more machine learned models, providing access to the first memory block; and in response to receiving a second access request in a second programming language to access a second memory block from a second machine learned model of the one or more machine learned models, providing access to the second memory block.

Additionally, at least one non-transitory computer-readable storage medium is disclosed. The computer-readable storage medium includes instructions that when executed by a processor, cause the processor to map, based at least in part on one or more configurable parameters, each data of a plurality of incoming data to a corresponding memory block; store, based at least in part on the one or more configurable parameters, each memory block to a storage location of a plurality of storage locations; in response to receiving a first access request to access a first memory block from a first machine learned model, providing access to the first memory block; and in response to receiving a second access request to access a second memory block from a second machine learned model, providing access to the second memory block. The first access request is in a first language and the second access request is in a second language, access to the first memory block is provided to the first machine learned model in the first programming language, and access to the second memory block is provided to the second machine learned model in the second programming language.

The present application further includes a computer implemented method including translating a first request to access a first memory block from a first format associated with a first programming language to a second format, wherein the request is received from a first machine learned model using the first programming language; providing access to the first memory block to the first machine learned model, wherein access to the first memory block is provided to the first machine learned model in the first programming language; translating a second request to access data at the first memory block to the second format, wherein the request is received from a second machine learned model; and providing access to data at the first memory block to the second machine learned model.

The present application further includes a computer implemented method including receiving a plurality of incoming data, wherein each of the plurality of incoming data includes a corresponding data type; preprocessing the plurality of incoming data to create a dataset; mapping the dataset to one or more corresponding memory blocks; storing each memory block of the one or more corresponding memory blocks to a storage location of the plurality of storage locations; and providing access to the dataset at the one or more corresponding memory blocks to two or more machine learning models, based on a determination that the two or more machine learned models have one or more dependencies on one another.

BRIEF DESCRIPTION OF THE DRAWINGS

Reference is now made to the following descriptions taken in conjunction with the accompanying drawings, in which.

DETAILED DESCRIPTION

Figure 1:
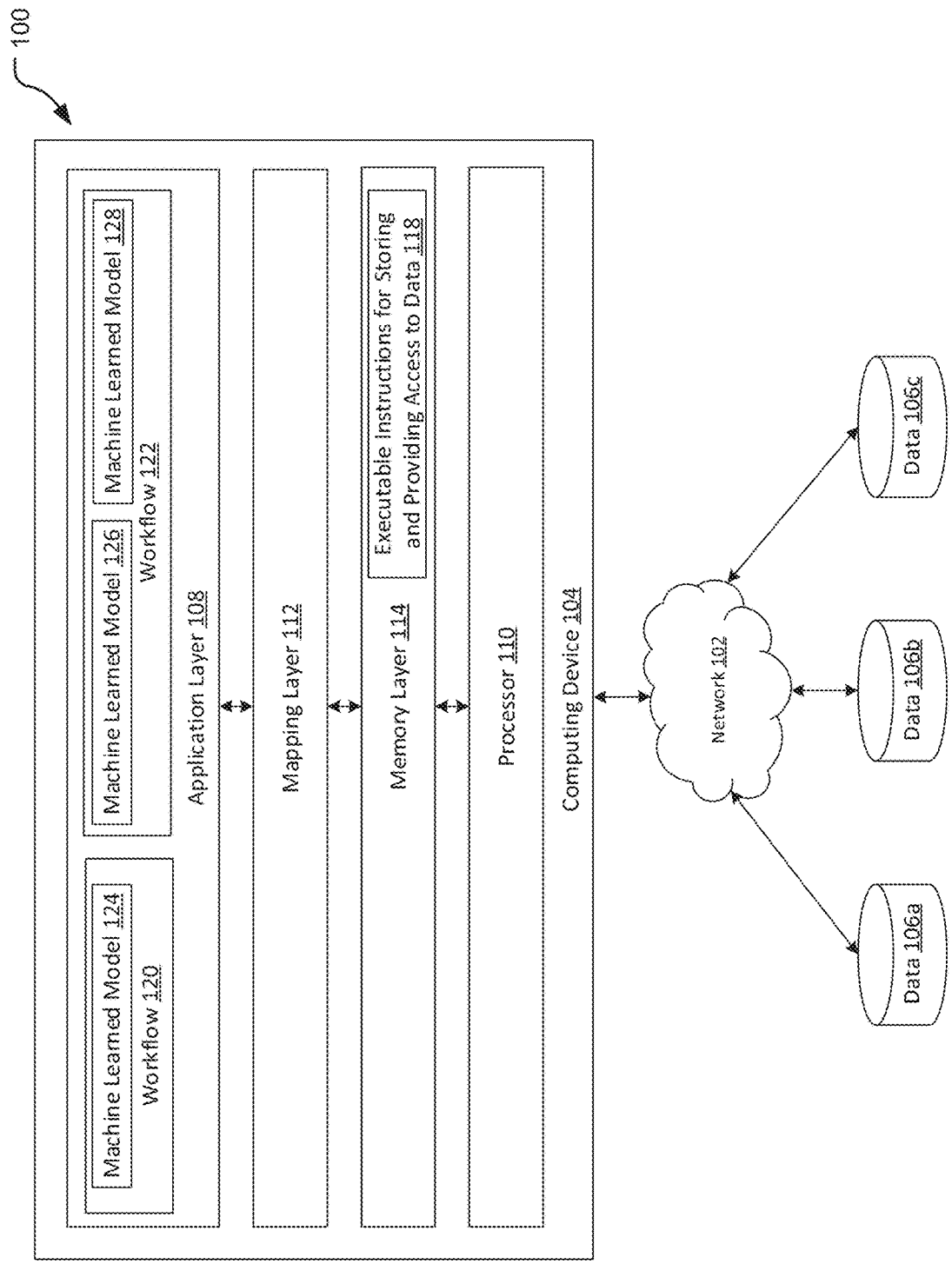
FIG. 1 is a schematic illustration of a system for storing and providing access to data across multiple machine learned models in a data-type agnostic and programming language-agnostic manner, in accordance with examples described herein.

Certain details are set forth herein to provide an understanding of described embodiments of technology. However, other examples may be practiced without various ones of these particular details. In some instances, well-known computing system components, virtualization components, circuits, control signals, timing protocols, and/or software operations have not been shown in detail in order to avoid unnecessarily obscuring the described embodiments. Other embodiments may be utilized, and other changes may be made, without departing from the spirit or scope of the subject matter presented herein.

One bottleneck of ML model training is the memory limit challenge. While increased data oftentimes means increased predictive accuracy when ML model training, the training process is both computation and memory-intensive. In recent years, the volume of datasets used in training, as well as the number of model-related parameters has increased exponentially, which in turn, has worsened the memory-bottleneck problem. For example, a 15 gigabyte (GB) model may require, at minimum, 30 GB of memory to fully process. Oftentimes, only the most advanced electronic devices, or expensive virtual graphical processing units (GPUs) and virtual storage, can handle such high resource demand.

Additionally, as reliance on machine learned models increases, and implementation of such models into products and services grow, so too does the need for multiple different machine learned models, applications, and the like to be able to access to the same dataset(s) in order to further train and/or to predict various outputs independent from the data type or language format of the model, or of the requested data stored in the memory blocks.

Advantageously, systems and methods described herein provide for efficiently storing incoming data used to train and evaluate multiple machine learned models to overcome memory limit constraints. Systems and methods described herein further provide for enabling the communication of, or providing access to, incoming data through data pipelines that are data-type and programming-language agnostic, such that the data may be available to multiple machine learned models, in real or near-real time, independent of the programming language of the model and the data type of the stored.

Conventional systems and methods oftentimes require the machine learned models to have exclusive access to its own specific dataset for training and evaluation, and that this dataset includes data specifically formatted for that particular machine learned model. As the volume of data used for training and evaluating grows (e.g., billion-point AI), such a burdensome requirement may exacerbate the memory constraint problem by requiring additional data duplication and repetition by limited memory and compute resources. Advantageously, systems and methods described herein provide for a robust access and transfer mechanism that allows data to be stored a single time, but accessed by one or more (or multiple) different machine learned models for different reasons, e.g., during the training and evaluating stages. As such, systems and methods described herein reduce memory load and usage requirements, as well as provide robust access to data saved in memory a single time, that currently plague existing systems and methods for machine learned training and evaluating. Further, the systems and methods described herein may allow data to be stored in various different locations, such as distributed and/or local memory resources, but such storage locations are abstracted from the applications requesting access to the data. This allows the platform to store data in locations based on system availability and the like, but the applications may still access the data as if the data is stored locally or in a preferred location for the application.

As one non-limiting example, a computing device may receive incoming data (e.g., data from an image sensor, a lidar detector, a radar detector, a light sensor, etc.). Upon receiving the data, the computing device may map that data to one or more memory blocks. The system may index the memory blocks with a unique index. Once the incoming data are mapped to memory blocks and indexed, the system may store the memory blocks in various storage locations, e.g., physical memory, distributed memory, physical disk, etc. During training or evaluating of a machine learned model, the model may require access to the saved data. Upon receiving a request to access the data from the machine learned model, the system may translate the request and, using the index, locate and retrieve the data. Once located, the system may provide the data to the machine learned model. The model may then read the data as if it were continuously stored in memory in order to enable real time or near-real time data access and output prediction, while in reality, the data may be stored in various locations. In this way, should a second machine learned model simultaneously require the same data for training and/or evaluation, it too may send a data access request, the system may translate that request and use the index to provide that data to the second machine learned model as though that data was saved in continuous memory for the second machine learned model. In other words, by mapping the incoming data to memory blocks and indexing them prior to storage, the system may simultaneously provide access to the same data to by multiple machine learned models, multiple applications, and the like, at the same time, while only saving the data a single time.

Accordingly, the present disclosure generally relates to systems and methods for storing incoming data and providing access to that data to multiple machine learned models in a data type-agnostic and programming language-agnostic manner. More specifically, the present disclosure generally relates to system and methods to mapping incoming data to one or more storage locations based on priority parameters, and then based on an access request from a machine learned model, providing access to that data in the programming language of the access request for use in training and/or evaluating by the machine learned model.

For example, a computing device communicatively coupled to storage, and including an application layer running one or more machine learned models, a mapping layer, a memory layer, and a processor, may receive a plurality of incoming data. In some examples, the incoming data may comprise hardcoded data from a user (e.g., a user of the computing device, a user of another computing device, etc.). In some examples, the incoming data may comprise one or more preexisting and/or newly uploaded datasets. In some examples, data of the incoming data may comprise a corresponding data type. In some examples, incoming data may be provided via one or more sensors, such as image sensors, light sensors, LIDAR detectors, radar detectors, thermal sensors, pressure sensors, accelerometers, proximity sensors, photoelectric sensors, humidity sensors, force sensors, contact sensors, level sensors, motion sensors, gas and chemical sensors, and the like. In some examples, the incoming data received from the sensors may include image data, light data, thermal data, variable distance and/or range data, range, angle, or velocity data, pressure data, speed data, force data, temperature data, weight, torque, and load data, data associated with the presence and properties of various gases or chemicals, and the like. In some examples, the data described herein may be received from sources other than sensors.

The computing device, having the mapping layer communicatively coupled to the processor, may map the plurality of incoming data to a corresponding memory block. In some examples, the mapping may be based at least in part on one or more configurable parameters. In some examples, the parameters may include priority parameters, or other types of parameters. In some examples, the one or more configurable parameters include a priority rank determination for the one or more storage locations. In some examples, the storage location may include local physical memory storage, network storage, distributed storage, disk storage, or combinations thereof. In some examples, mapping data of the plurality of incoming data to the corresponding memory block is data-type agnostic.

The computing device, having the mapping layer communicatively coupled to the processor, may further perform a scoring algorithm on each data of the plurality of incoming data. In some examples, the scoring algorithm may determine a level of importance or tier for data of the plurality of incoming data. In some examples, the scoring algorithm comprises a sliding window algorithm, a cached data algorithm, a Pearson correlation algorithm, a chi-squared algorithm, a recursive feature elimination algorithm, a lasso algorithm, a tree-based algorithm, or combinations thereof. In some examples, the scoring algorithm is a feature importance scoring algorithm that may determine a feature importance score for data of the plurality of incoming data.

The computing device may also map respective incoming data to a corresponding memory block based at least in part on the determined tier for data of the plurality of incoming data. The memory blocks may be stored at a storage location. In some examples, the memory block may be stored base at least in part on the one or more configurable parameters. In some examples, and as described herein, the memory block may be tagged (e.g., indexed) with a unique index that may correspond to the determined tier for the memory block, and may enable the system to both locate the data once stored and enable the system to read (or use) the data upon receiving, for example, a data access request.

The computing device may then provide access to a first memory block in response to receiving a first access request to access the first memory block, e.g., a request from an ML model and/or application requesting the data. In some examples, the first access request may be formatted in a first programming language, and may be received by the mapping layer from a first machine learned model of the application layer. In some examples, the mapping layer communicatively coupled to the processor, may provide the first memory block to the first machine learned model in the first programming language (e.g., in the same or similar programming language as the first access request).

The computing device may provide access to a second memory block in response to receiving a second access request to access the second memory block. In some examples, the second access request may be formatted in a second programming language, and may be received by the mapping layer from a second machine learned model of the application layer. In some examples, the mapping layer communicatively coupled to the processor, may provide the second memory block to the second machine learned model in the second programming language (e.g., in the same or similar programming language as the second access request).

In some examples, the first programming language of the first access request may be the same as the second programming language of the second access request. In some examples, the first programming language of the first access request may be different from the second programming language of the second access request. In some examples, the first programming language, the second programming language, or combinations thereof, may be formatted and/or written in various computing programming languages, including but not limited to, python, JavaScript, R, hypertext processor (PHP), practical extraction and report language (PERL), Ruby, C, C+, or combinations thereof.

In some examples, and in addition to the first and second access requests, the computing device may provide access to a third memory block stored in one of the plurality of storage locations in response to receiving a third access request to access the first memory block. In some examples, the third access request may be formatted in a third programming language, and may be received by the mapping layer from a third machine learned model of the application layer. In some examples, the mapping layer communicatively coupled to the processor, may provide the first memory block to the third machine learned model in the third programming language (e.g., in the same or similar programming language as the second access request). In this way, systems and methods provided herein may provide the same data to one or more machine learned models, where models and access requests for the data, may be written and/or formatted in a different programming language.

In some examples, the first access request may include reading the first memory block, editing (e.g., writing) the first memory block, deleting the first memory block, or combinations thereof. In some examples, the second access request may include reading the second memory block, editing (e.g., writing) the second memory block, deleting the second memory block, or combinations thereof. In some examples, the third access request may include reading the first memory block, editing (e.g., writing) the first memory block, deleting the first memory block, or combinations thereof.

In some examples, the machine learned models requesting access to the data stored in the memory blocks may use that data to train and/or predict outcomes. For example, in some examples, the computing device having the application layer running a machine learned model (e.g., a machine learned model, one or more machine learned models, a plurality of machine learned models, a first, second, and third machine learned model, etc.) may train the first machine learned model using the data included in the first memory block. In some examples, the training may be based at least on receiving the first memory block in response to the first access request. In some examples, the data in the first memory block may be received in real time, near-real time, or combinations thereof.

In some examples, the computing device may train the second machine learned model using the data included in the second memory block. In some examples, the training may be based at least on receiving the second memory block in response to the second access request. In some examples, the data in the second memory block may be received in real time, near-real time, or combinations thereof.

In some examples, the machine learned model requesting access to the data stored in the memory blocks may use that data to evaluate (e.g., score). For example, the computing device may further provide access to a fourth memory block stored in one of the plurality of storage locations in response to receiving a fourth access request to access a fourth memory block. In some examples, the fourth access request may be formatted in the first programming language, and may be received by the mapping layer from the first machine learned model of the application layer. In some examples, the mapping layer communicatively coupled to the processor, may provide the fourth memory block to the first machine learned model in the first programming language (e.g., in the same or similar programming language as the second access request).

In some examples, the computing device may train the first machine learned model using the data (e.g., the evaluation data) included in the fourth memory block. In some examples, the data in the fourth memory block may be received in real time, near-real time, or combinations thereof.

In some examples, data stored in the memory blocks may be training data, evaluation data, other types of data used and/or not used by the machine learned models, or combinations thereof. In some examples, the data stored in the memory blocks may be associated with one or more data types. In some examples, the data types may include, but are not limited to, Boolean data, character data, date data, double data, floating-point number data, integer data, long data, short data, string data, void data, machine-type data, and composite-type data, etc. As should be appreciated, while several data and/or data types are listed, this list is in no way exhaustive and other data and/or data types are contemplated to be within the scope of this disclosure.

Turing to the figures, FIG. 1 is a schematic illustration of a system 100 for storing and providing access to data across multiple machine learned models in a data-type agnostic and programming language-agnostic manner, in accordance with examples described herein. It should be understood that this and other arrangements and elements (e.g., machines, interfaces, function, orders, and groupings of functions, etc.) can be used in addition to or instead of those shown, and some elements may be omitted altogether. Further, many of the elements described herein are functional entities that may be implemented as discrete or disturbed components or in conjunction with other components, and in any suitable combination and location. Various functions described herein as being performed by one or more components may be carried out by firmware, hardware, and/or software. For instance, and as described herein, various functions may be carried out by a processor executing instructions stored in memory.

System 100 of FIG. 1 includes computing device 104 and data stores 106a, 106b, and 106c (e.g., a non-transitory storage medium) (herein collectively known as data stores 106). Computing device 104 includes application layer 108, processor 110, mapping layer 112, and memory layer 114. Application layer 108 includes a workflow 120 including a machine learned model 124 and a workflow 122 including machine learned models 126 and 128. Memory layer 114 includes executable instructions for storing and providing access to data 118. It should be understood that system 100 shown in FIG. 1 is an example of one suitable architecture for implementing certain aspects of the present disclosure. Additional, fewer, and/or alternative components may be used in other examples.

It should be noted that implementations of the present disclosure are equally applicable to other types of devices such as mobile computing devices and devices accepting gesture, touch, and/or voice input. Any and all such variations, and any combinations thereof, are contemplated to be within the scope of implementations of the present disclosure. Further, although illustrated as separate components of computing device 104, any number of components can be used to perform the functionality described herein. Additionally, although illustrated as being a part of computing device 104, the components can be distributed via any number of devices. For example, processor 110 may be provided by one device, server, or cluster of servers, while memory layer 114 may be provided via another device, server, or cluster of servers. Moreover, application layer 108 may also be provided by one device, server, or cluster of servers, while mapping layer 112 may be provided via another device, server, or cluster of servers, while memory layer 114 may further be provided via another device, server, or cluster of servers. Additionally, while shown as only one device, computing device 104 may include additional computing devices, user devices, administrator devices, and the like. For example, while not shown, system 100 may include computing device 104 and additional user devices for performing methods described herein. In some examples, user devices (not shown) may host one or more application layers that may host one or more machine learned models. In some examples, such user devices may be in communication with computing device 104. In some examples, application layer 108 and/or machine learned models 124, 126, and 128 may be hosted on a user device (not shown), and may be in communication with mapping layer 112 and/or memory layer 114 hosted on computing device 104. In some examples, workflow 120 and machine learned model 124 may be hosted on a first user device (not shown) in communication with mapping layer 112 and/or memory layer 114 hosted on the computing device 104, while workflow 122 and machine learned models 126 and 128 may be hosted on a second user device (not shown) in communication with mapping layer 112 and/or memory layer 114.

As shown in FIG. 1, computing device 104 and data stores 106a-106c (as well as additional and or alternative user devices not shown) may communicate with each other via network 102, which may include, without limitation, one or more local area networks (LANs), wide area networks (WANs), cellular communications or mobile communications networks, Wi-Fi networks, and/or BLUETOOTH® networks. Such networking environments are commonplace in offices, enterprise-wide computer networks, laboratories, homes, educational institutions, intranets, and the Internet. Accordingly, network 102 is not further described herein. It should be understood that any number of user devices and/or computing devices may be employed within system 100 and be within the scope of implementations of the present disclosure. Each may comprise a single device or multiple devices cooperating in a distributed environment. For instance, computing device 104 could be provided by multiple server devices collectively providing the functionality of computing device 104 as described herein. Additionally, other components not shown may also be included within the network environment.

As described, computing devices 104 may communicate with and/or have access (via network 102) to at least one data store repository, such as data stores 106a-106c, which stores data and metadata associated with storing and providing access to data across multiple machine learned models in a data-type agnostic and programming language-agnostic manner. For example, data stores 106a-106c may store data and metadata associated with one or more datasets, including training datasets and/or scoring (e.g., evaluation) datasets for use by the machine learned model(s) described herein. For example, data stores 106a-106c may store data and metadata associated with a weather dataset, a safety condition dataset, and the like. In some examples, data stores 106a-106c may store data and metadata associated one or more datasets, further including a data type for the data in the data sets.

Data stores 106a-106c may further store data and metadata associated with the machine learned model(s) described herein. For example, data stores 106a-106c may store data and metadata associated with one or more machine learned model(s), including supervised learning machine learned models (e.g., classification, regression, etc.), unsupervised learning machine learned models (e.g., dimensionality reduction, clustering, etc.), reinforcement learning machine learned models, semi-supervised learning machine learned models, self-supervised machine learned models, multi-instance learning machine learned models, inductive learning machine learned models, deductive learning machine learned models, transductive learning machine learned models, and the like. In some examples, the one or more machine learned model(s) stored in data stores 106a-106c may be built in various ways. For example, the machine learned model(s) may be built based on running data received from sensors, deices, and locations through an algorithm to generate the machine learned model(s). In some examples, the machine learned models may be built elsewhere, and stored by a user, customer, end-user, administrator, or the like in data stores 106a-106c. In some examples, the machine learned model(s) may be downloaded from, for example, the Internet, and stored in data stores 106a-106c. As should be appreciated, while the data and metadata in data stores 106a-106c is discussed in connection with use for machine learned model(s), retrieval and/or use of such data and/or metadata in data stores 106a-106c may be used for other purposes, such as, for example, other applications not associated with machine learned model(s), algorithms, and/or any other computer program, application, operation, and or task that may desire access to the data and/or metadata.

In implementations of the present disclosure, data stores 106a-106c are configured to be retrievable (and/or searchable) for the data and metadata stored in data stores 106a-106c. It should be understood that the information stored in data stores 106a-106c may include any information relevant storing and providing access to data across multiple machine learned models in a data-type agnostic and programming language-agnostic manner, data and metadata associated with one or more datasets, including training datasets and/or scoring, data and metadata associated with one or more machine learned model(s), and the like. As should be appreciated, data and metadata stored in data stores 106a-106c may be added, removed, replaced, altered, augmented, etc. at any time, with different and/or alternative data. It should further be appreciated that each of data stores 106a, 106b, and/or 106c may be updated, repaired, taken offline, etc. at any time without impacting the other data stores. It should further be appreciated that while three data stores are illustrated, additional and/or fewer data stores may be implemented and still be within the scope of this disclosure.

Information stored in data stores 106a-106c may be accessible to any component of system 100. The content and the volume of such information are not intended to limit the scope of aspects of the present technology in any way. Further, data stores 106a-106c may be single, independent components (as shown) or a plurality of storage devices, for instance, a database cluster, portions of which may reside in association with computing device 104, an external user device (not shown) another external computing device (not shown), another external user device (not shown), and/or any combination thereof. Additionally, data stores 106a-106c may include a plurality of unrelated data repositories or sources within the scope of embodiments of the present technology. Data stores 106a-106c may be updated at any time, including an increase and/or decrease in the amount and/or types of stored data and metadata. As described herein, data stores 106 may include but are not limited to, local physical memory storage, network storage, distributed storage, disk storage, or combinations thereof.

Examples described herein may include computing devices, such as computing device 104 of FIG. 1. Computing device 104 may in some examples be integrated with one or more user devices (not shown), as described herein. In some examples, computing device 104 may be implemented using one or more computers, servers, smart phones, smart devices, tables, and the like. Computing device 104 may implement text storing and providing access to data across multiple machine learned models in a data-type agnostic and programming language-agnostic manner. As described herein, computing device 104 includes application layer 108, processor 110, mapping layer 112, and memory layer 114. Application layer 108 includes a workflow 120 including a machine learned model 124 and a workflow 122 including machine learned models 126 and 128. Workflows 120 and 122 may, in various examples, be individual applications or other collections of functions and/or modules collectively performing a programmed function. Workflows 120 and 122 Memory layer 114 includes executable instructions storing and providing access to data 118 which may be used to implement storing and providing access to data across multiple machine learned models in a data-type agnostic and programming language-agnostic manner. In some embodiments, computing device 104 may be physically coupled to a user device (not shown). In other embodiments, computing device 104 may not be physically coupled to a user device (not shown) but collocated with the user device. In further embodiments, computing device 104 may neither be physically coupled to a user device (not shown) nor collocated with the user device.

As described herein, computing device 104 may include one or more user devices (not shown). In some examples, a user device may be communicatively coupled to various components of system 100 of FIG. 1, such as, for example, computing device 104. A user device may include any number of computing devices, including a head mounted display (HMD) or other form of AR/VR headset, a controller, a tablet, a mobile phone, a wireless PDA, touchless-enabled device, other wireless (or wired) communication device, or any other device capable of executing machine-language instructions. Examples of user devices described herein may generally implement the receiving of data (e.g., datasets, individual data, etc.) the receiving of data in a memory block stored in data stores 106a-106c in response to sending a data access request, as well as the training and/or evaluation of one or more machine learned models running on an application layer, such as application layer 108 of FIG. 1.

Computing devices, such as computing device 104 described herein may include one or more processors, such as processor 110. Any kind and/or number of processor may be present, including one or more central processing unit(s) (CPUs), graphics processing units (GPUs), other computer processors, mobile processors, digital signal processors (DSPs), microprocessors, computer chips, and/or processing units configured to execute machine-language instructions and process data, such as executable instructions for storing and providing access to data 118.

Computing devices, such as computing device 104, described herein may further include memory layer 114. Any type or kind of memory may be present (e.g., read only memory (ROM), random access memory (RAM), solid-state drive (SSD), and secure digital card (SD card)). While a single box is depicted as memory layer 114, any number of memory devices may be present. Memory layer 114 may be in communication (e.g., electrically connected) with processor 110. In many embodiments, the memory layer 114 may be non-transitory.

The memory layer 114 may store executable instructions for execution by the processor 110, such as executable instructions for storing and providing access to data 118. Processor 110, being communicatively coupled to user device 104, and via the execution of executable instructions for storing and providing access to data 118, may enable or perform actions for storing and providing access to data across multiple machine learned models in a data-type agnostic and programming language-agnostic manner for training and evaluating one or more machine learned models.

Computing devices, such as computing device 104 may include an application layer 108. Application layer 108 may be communicatively coupled to processor 110, mapping layer 112, and memory layer 114, and may include various workflows (e.g., applications) including one or more machine learned models. For example, the application layer 108 may include the workflow 120 including the machine learned model 124 and the workflow 122 include machine learned models 126 and 128. In some examples, the application layer 108 may include fewer or additional workflows. For example, the application layer 108 may include one workflow or three or more workflows.

In various examples, machine learned models in the same workflow (e.g., machine learned models 126 and 128) may produce compound predictions based on the same data. For example, the models may be trained using the same data. In some examples, a first machine learned model may output a first prediction or set of predictions and a second machine learned model in the same workflow may output a second prediction or set of predictions based on the first prediction or set of predictions. To pass the first prediction or set of predictions to the second machine learned model, the first machine learned model may, in some examples, write the first prediction or set of predictions to a data block (e.g., at a data store 106a-106c), which may be accessed by the second machine learned model. In some examples, an application layer as described herein may include computing software designed to carry out one or more specific tasks and/or operations, many times, for example, for a user, end-user, customer, administrator, or the like. In some examples, application layer 108 may include a word processor, a spreadsheet program, an accounting application, a web browser, an email client, a media player, a console game, or a photo editor. In some examples, application layer 108 may include computing software designed to train and/or evaluate a machine learned model, such as machine learned models 124, 126, and 128.

Operationally, and as described herein, application layer 108 may be configured to, utilizing processor 110 executing executable instructions for storing and providing data 118, send an access request to a mapping layer (such as mapping layer 112) to gain access to data stored in a memory block, stored in a data repository, such as data stores 106a-106c. In some examples, the access request may be sent in response to receiving a user input to send the request. In some examples, the access request may be sent in response to receiving an input from a customer, an end-user, and administrator, or the like. In some examples, the request may be sent in response to a user, customer, end-user, administrator, or the like, training or evaluating a machine learned model, such as machine learned models 124, 126, and/or 128. In some examples, the data request may be sent in a number of programming languages, including but not limited to, python, JavaScript, R, hypertext processor (PHP), practical extraction and report language (PERL), Ruby, C, C+, or combinations thereof. In some examples, the data access request is in the same programming language as the machine learned model. In some examples, the data access request is in a programming language different from the machine learned model.

As described herein, application layer 108 may be configured to, utilizing processor 110 executing executable instructions for storing and providing data 118, receive data from, for example, mapping layer 112 in response to sending a data access request. In some examples, the received data may be an evaluation data set, a training dataset, individual data not contained in a dataset, other types of data, or combinations thereof. In some examples, application layer 108 may be configured to train and/or evaluate machine learned model 124, 126, and/or 128 based on the received data. In some examples, application layer 108 may be configured to receive data from, for example, mapping layer 112 application layer 108 may be configured to receive data from, for example, mapping layer 112 in various programming languages, including but not limited to, python, JavaScript, R, hypertext processor (PHP), practical extraction and report language (PERL), Ruby, C, C+, or combinations thereof. In some examples, the data provided by mapping layer 112 to application layer 108 may be in the same programming language as the data request. In some examples, the data provided by mapping layer 112 to application layer 108 may be in a programming language different from the data request.

As should be appreciated, while a single application layer and a single machine learned model are illustrated, additional and/or alternative application layers and/or machine learned models are contemplated to be within the scope of this disclosure.

Computing devices, such as computing device 104 described herein may include a mapping layer, such as mapping layer 112 of FIG. 1. Mapping layer 112 may be communicatively coupled to any number of components of system 100 of FIG. 1.

Operationally, and as described herein, mapping layer 112 may be configured to, utilizing processor 110 executing executable instructions for storing and providing data 118, receive a plurality of incoming data, from, for example, one or more sensor (not shown), a data repository (e.g., data stores 106, other data repositories), from the Internet, as well as from users, end-users, customers, administrators, and the like. In some examples, the incoming data may comprise hardcoded data from a user (e.g., a user of the computing device, a user of another computing device, a user of a user device, a customer, an administrator, an end-user, etc.). In some examples, the incoming data may comprise one or more preexisting and/or newly uploaded datasets. In some examples, the data of the incoming data may comprise a corresponding data type.

Mapping layer 112 may be configured to, utilizing processor 110 executing executable instructions for storing and providing data 118, map the plurality of incoming data to a corresponding memory block. In some examples, the mapping may be based at least in part on one or more configurable parameters. In some examples, the one or more configurable parameters may include a priory rank determination for the one or more storage locations. In some examples, the storage location may include local physical memory storage, network storage, distributed storage, disk storage, or combinations thereof. In some examples, mapping each data of the plurality of incoming data to the corresponding memory block is data-type agnostic.

Mapping layer 112 may be configured to, utilizing processor 110 executing executable instructions for storing and providing data 118, additionally and/or optionally perform a scoring algorithm on data of the plurality of incoming data. In some examples, the scoring algorithm may determine a tier for data of the plurality of incoming data. In some examples, the scoring algorithm may comprise a sliding window algorithm, a cached data algorithm, a Pearson correlation algorithm, a chi-squared algorithm, a recursive feature elimination algorithm, a lasso algorithm, a tree-based algorithm, or combinations thereof. In some examples, the scoring algorithm may be a feature importance scoring algorithm that, in some examples, may determine a feature importance score for data of the plurality of incoming data.

In some examples, mapping layer 112 may be configured to, utilizing processor 110 executing executable instructions for storing and providing data 118, map the plurality of incoming data to a corresponding memory block based at least in part on the determined tier for data of the plurality of incoming data.

Mapping layer 112 may be configured to, utilizing processor 110 executing executable instructions for storing and providing data 118, store the memory block to a storage location of the plurality of storage locations as described herein. In some examples, the memory block may be stored based at least in part on the one or more configurable parameters.

Mapping layer 112 may be configured to, utilizing processor 110 executing executable instructions for storing and providing data 118, provide (e.g., grant, allow, etc.) access to a first memory block stored in one of the plurality of storage locations in response to receiving a first access request to access the first memory block. In some examples, the first access request may be formatted in a first programming language, and may be received by the mapping layer from a first machine learned model (e.g., machine learned model 124, 126, or 128) of the application layer. In some examples, the mapping layer communicatively coupled to the processor, may provide the first memory block to the first machine learned model in the first programming language (e.g., in the same or similar programming language as the first access request).

In some examples, the mapping layer 112 may be further configured to, utilizing processor 110 executing executable instructions for storing and providing data 118, determine whether to provide access to the first memory block to the first machine learned model directly (e.g., by providing read or read/write access to the first memory block) or indirectly by copying the first memory block to another location for access by the first machine learned model. Such a determination may be based on, for example, the location of the first machine learned model in a workflow of the application layer 108 and/or other machine learned models already accessing the first memory block. For example, machine learned models in the same workflow may be able to directly access the first memory block at the same time, while a machine learned model in another workflow may be provided access to the first memory block through a copy of the first memory block to prevent machine learned models in different workflows from directly accessing the first memory block at the same time, potentially interfering with one another.

In various examples, the mapping layer 112 may determine whether a first machine learning model is in the same workflow as a second machine learning model by determining whether the first machine learning model has one or more dependencies on the second machine learning model or the second machine learning model has one or more dependencies on the first machine learning model. In various examples, a machine learning model, when requesting access to data may communicate its dependencies with the mapping layer 112. For example, a machine learning model and/or the mapping layer 112 may determine dependencies of the machine learning model by performing a reverse traversal of the machine learning models in a workflow to locate neighbors of the machine learning model and/or other machine learning models in the workflow.

Mapping layer 112 may be configured to, utilizing processor 110 executing executable instructions for storing and providing data 118, provide (e.g., grant, allow, etc.) access to a second memory block stored in one of the plurality of storage locations in response to receiving a second access request to access the second memory block. In some examples, the second access request may be formatted in a second programming language, and may be received by the mapping layer from a second machine learned model of the application layer. In some examples, the mapping layer communicatively coupled to the processor, may provide the second memory block to the second machine learned model in the second programming language (e.g., in the same or similar programming language as the second access request). In some examples, the mapping layer 112 may be further configured to, utilizing processor 110 executing executable instructions for storing and providing data 118, determine whether to provide access to the second memory block to the second machine learned model directly (e.g., by providing read or read/write access to the first memory block) or indirectly by copying the second memory block to another location for access by the second machine learned model.

In some examples, and as described herein, the first programming language of the first access request may be the same as the second programming language of the second access request. For example, both the first access request and the second access request may be in python. In some examples, the first programming language of the first access request may be different from the second programming language of the second access request. For example, the first access request may be in python, while the second access request may be in JavaScript. In some examples, the first programming language, the second programming language, or combinations thereof, may be formatted and/or written in various computing programming languages, including but not limited to, python, JavaScript, R, hypertext processor (PHP), practical extraction and report language (PERL), Ruby, C, C+, or combinations thereof.

Mapping layer 112 may be further configured to, utilizing processor 110 executing executable instructions for storing and providing data 118, provide access to a third memory block stored in one of the plurality of storage locations in response to receiving a third access request to access the first memory block. In some examples, the third access request may be formatted in a third programming language, and may be received by the mapping layer from a third machine learned model of the application layer. In some examples, the mapping layer communicatively coupled to the processor, may provide the first memory block to the third machine learned model in the third programming language (e.g., in the same or similar programming language as the second access request). In this way, systems and methods provided herein may provide the same data to one or more machine learned models, where the model and the access requests for the data, is written and/or formatted in a different programming language.

It should be noted that in various instances, the mapping layer may generate and store a map or index that can be utilized to retrieve data as accessed by the different applications, e.g., first, second, third, and fourth ML models. In these instances, the map or index may be utilized to translate a request from the application to determine the actual storage location of the data (which may be different from that indicated in the request). For example, such a map or index may translate the syntax of a data request from a first programming language to a second programming language. Such a map or index may further be used to translate a data type of data stored at the requested storage location to a data type usable by the requesting machine learned model based on the programming language and/or platform utilized by the requesting machine learned model.

Figure 2:
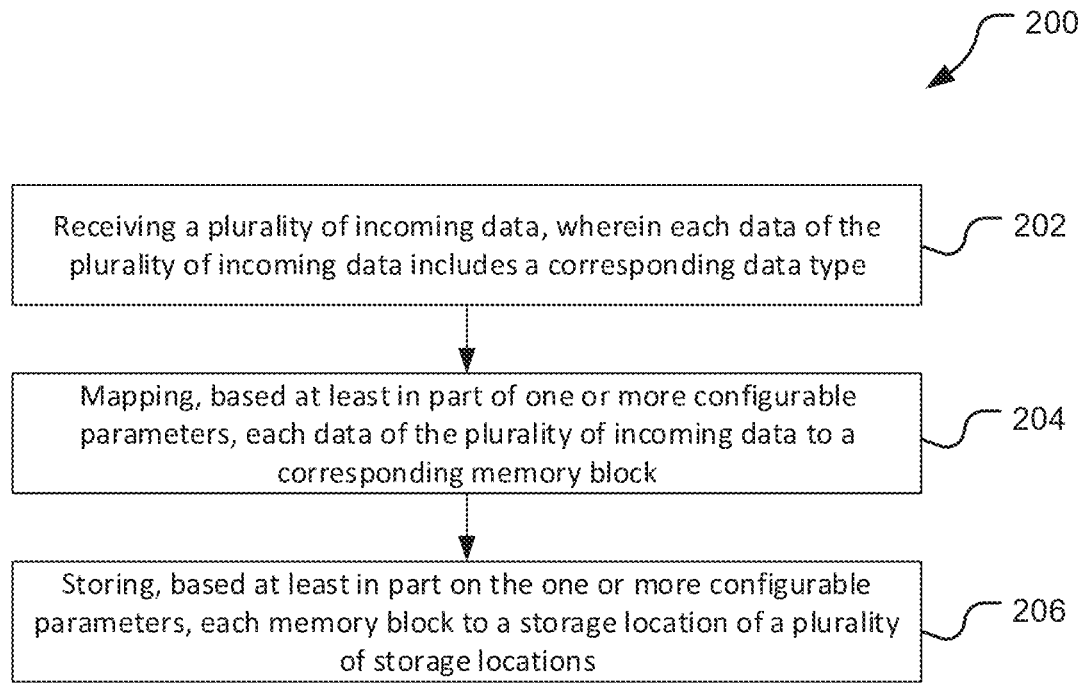
FIG. 2 is a flowchart of a method for storing and indexing data, in accordance with examples described herein.

Now turning to FIG. 2, FIG. 2 is a flowchart of a method 200 for storing and indexing incoming data in a data-type agnostic and programming language-agnostic manner, in accordance with examples described herein. The method 200 may be implemented, for example, using the system 100 of FIG. 1 and/or computing system 400 of FIG. 4.

The method 200 includes receiving a plurality of incoming data, wherein data of the plurality of incoming data includes a corresponding data type in step 202; mapping, based at least in part on one or more configurable parameters, the data of the plurality of incoming data to a corresponding memory block in step 204; and, storing, based at least in part on the one or more configurable parameters, the memory block to a storage location of a plurality of storage locations in step 206.

Step 202 includes receiving a plurality of incoming data, wherein data of the plurality of incoming data includes a corresponding data type. The incoming data may be received at the computing device 104 of the system 100. In various examples, the incoming data may be received from the same data source (e.g., a single sensor, a single database, or the like). In some examples, the incoming data may comprise hardcoded data from a user (e.g., a user of the computing device, a user of another computing device, etc.). In some examples, the incoming data may comprise one or more preexisting and/or newly uploaded datasets. In some examples, data of the incoming data may comprise a corresponding data type. In some examples, data may be received in various data types and may be translated by the computing device 104 to serialized data. Such serialization may allow for translation of the stored serialized data into various data types and/or formats which may be used by requesting machine learned models utilizing different programming languages and/or platforms.

In some examples, step 202 may further include preprocessing the plurality of incoming data such that the incoming data may be more easily utilized by various machine learned models. For example, some machine learned models utilizing the incoming data may be located in a processing environment accessible by the computing device 104 and/or remote from the computing device 104. For example, such processing environments may include remote servers and/or cloud computing locations. Preprocessing the incoming data may, accordingly, reduce processing occurring at such processing environments, which may result in more efficient processing. For example, such preprocessing may include cleaning up received data by, for example, removing empty rows from spreadsheets or other data structures including incoming data or filing empty locations with data values (e.g., average, median, or mean data values and/or values obtained by other statistical predictions or estimates for missing or omitted data). Such preprocessing may further include translating some variables (e.g., categorical variables) to labels. For example, days of the week may be translated into numbers from 1 to 7, where Monday correlates to 1, Tuesday correlates to 2, etc. Preprocessing may further include labeling some data as test data and some data as training data for use by machine learning models, neural networks and the like. In some examples, where data is received as a spreadsheet or translated into a spreadsheet at the computing device 104, preprocessing may further include marking some columns as training columns and some columns as target columns.

Step 204 includes, mapping, based at least in part on one or more configurable parameters, data of the plurality of incoming data to a corresponding memory block. In some examples, the one or more configurable parameters include a priory rank determination for the one or more storage locations. As described herein, the mapping may comprise indexing (e.g., tagging) the memory block with a unique index that may correspond to the determined tier for the memory block, and may enable the system to both locate the data once stored and enable the system to read (e.g., use, retrieve, etc.) the data upon receiving, for example, a data access request.

Step 206 includes, storing, based at least in part on the one or more configurable parameters, the memory block to a storage location of a plurality of storage locations. In some examples, the storage location may include local physical memory storage, network storage, distributed storage, disk storage, or combinations thereof. The mapping layer 112 and/or the memory layer 114 may store the data in a common format, such as a little endian format, which may be utilized by a variety of platforms that may be hosting applications (e.g., workflows) including machine learned models that may be requesting the data. Should a machine learned model utilize a different format (e.g., big endian format), the memory layer 114 and/or the mapping layer 112 may translate the data between formats when providing the data to the requesting machine learned model.

Figure 3:
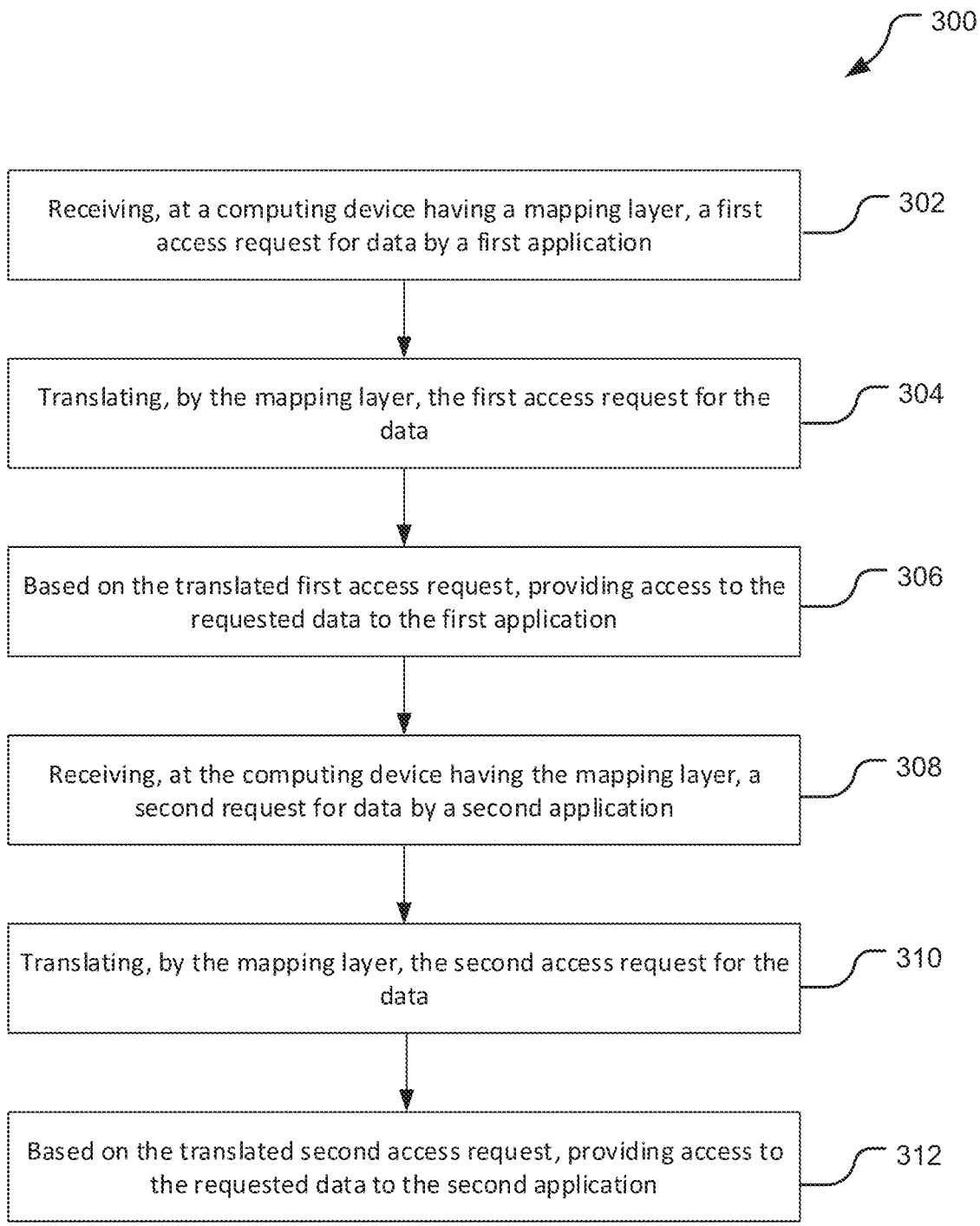
FIG. 3 is a flowchart of a method for accessing stored and indexed data, in accordance with examples described herein.

Now turning to FIG. 3, FIG. 3 is a flowchart of a method 300 for accessing stored and indexed data, in accordance with examples described herein. The method 300 may be implemented, for example, using the system 100 of FIG. 1 and/or computing system 400 of FIG. 4.

The method 300 includes receiving, at a computing device having a mapping layer, a first access request for data by a first application in step 302; translating, by the mapping layer, the first access request for the data in step 304; based on the translated first access request, providing access to the requested data to the first application in step 306; receiving, at the computing device having the mapping layer, a second request for data by a second application in step 308; translating, by the mapping layer, the second access request for the data in step 310; and, based on the translated second access request, providing access to the requested data to the second application in step 312.

Step 302 includes, receiving, at a computing device having a mapping layer, a first access request for data by a first application. As described herein, in some examples, the first access request may be formatted and/or written in a first programming language, including but not limited to, python, JavaScript, R, hypertext processor (PHP), practical extraction and report language (PERL), Ruby, C, C+, or combinations thereof.

Step 304 includes translating, by the mapping layer, the first access request for the data. As described herein, upon receiving a data access request, the system may translate the data access request. In examples, translating the data access request may enable the system to use the index to locate, read, retrieve, and/or provide the requested data to the first application. Such translation may, in various examples, translate a request object received from the first application in a first programming language into a request formatted for use by the memory layer 114 to retrieve the requested data. For example, the first application may send the request for the data as a python data object, and the mapping layer 112 may translate the request to a node.js request, which may be utilized by the memory layer 114 to retrieve and/or provide access to the requested data. Such translation may utilize various mappings of programming languages, code, and/or other executable instructions stored at and/or accessible by the mapping layer 112.

Step 306 includes based on the translated first access request, providing access to the requested data to the first application. In various examples, the mapping layer 112 and/or the memory layer 114 may, at step 306, translate the requested data before providing the data to the first application. Accordingly, the data may be provided to the first application in a format and/or object usable by the programming language and/or platform of the first application. For example, the mapping layer 112 and/or the memory layer 114 may deserialize the requested data to create a data object usable by the first application. In some examples, the mapping layer 112 may translate the data further based on data formats used by a platform hosting the application. For example, the relevant data may be stored in a little endian format, and the mapping layer 112 may translate the data to a big endian format when used by the platform. Such translation may, in various examples, include utilizing checksums or other methods to verify that the data being provided to the application is correct.

In some examples, the mapping layer 112 may provide access to the requested data by providing the application and or machine learned model with read or read/write access to the storage location of the requested data. The mapping layer 112 may, alternatively or additionally, provide access to the requested data by copying the requested data to another storage location and providing read or read/write access to the another storage location to the application. A determination of whether to provide access to the data directly or through copying the data to another storage location may be made based on the identity of the application or workflow hosting the machine learned model requesting the data and the identity of application(s) hosting other machine learned models having access to the data. For example, where a machine learned model having access to the data location is hosted by the same application or dataflow as the machine learned model requesting access, the machine learned model requesting access may be given direct access to the data through read or read/write permissions to the storage location of the requested data. Where a machine learned model having access to the data location is hosted by a different application or workflow than the machine learned model requesting access, the machine learned model requesting access may be given access to another storage location to which the data has been copied.

In some examples, the data provided by the mapping layer to the first application may be used, in some examples, to train and/or evaluate a machine learned model. In some examples, the data provided to the first application may be used, for other tasks, operations, and the like other than training and/or evaluating a machine learned model. In some examples, the data provided to the first application may be used for tasks, operations, and the like associated with and/or pertaining to artificial intelligence (e.g., artificial intelligence engines, etc.).

Step 308 includes receiving, at the computing device having the mapping layer, a second request for data by a second application. As described herein, in some examples, the second access request may be formatted and/or written in a first programming language, including but not limited to, python, JavaScript, R, hypertext processor (PHP), practical extraction and report language (PERL), Ruby, C, C+, or combinations thereof. The access request may, in various examples, be formatted as a request object in the first programming language.

Step 310 includes translating, by the mapping layer, the second access request for the data. As described herein, upon receiving a data access request, the system may translate the data access request. In examples, translating the data access request enables the system to use the index to locate, read, retrieve, and/or provide the requested data. In examples, translating the data access request may enable the system to use the index to locate, read, retrieve, and/or provide the requested data to the second application. As described with respect to step 304, the mapping layer 112 may translate the request from a first format associated with the first programming language to a second format that may be utilized by, for example, the memory layer 114 to retrieve and/or provide access to the requested data.

Step 312 includes based on the translated second access request, providing access to the requested data to the second application. In some examples, the data provided by the mapping layer to the second application may be used, in some examples, to train and/or evaluate a machine learned model. In some examples, the data provided to the second application may be used, for other tasks, operations, and the like other than training and/or evaluating a machine learned model. In some examples, the data provided to the second application may be used for tasks, operations, and the like associated with and/or pertaining to artificial intelligence (e.g., artificial intelligence engines, etc.).

As described herein, upon receiving a data access request, the system may translate the data access request, and subsequently use the index to locate, read, retrieve, and/or provide the requested data. In some examples, the data requested by the first machine learned model may be the same as the data requested by the second machine learned model. By storing the incoming data in a memory block, and indexing the memory block with a unique index that may correspond to the determined tier for the memory block, systems and methods described herein further enable the system to locate, read, retrieve, and/or provide the same requested data by multiple machine learning model(s) and/or applications, etc., at the same time. Additionally, and in this way, the system may be able to locate, read, retrieve, and/or provide the requested data independent of the specific formatting or programming language of the data access request.

As described with respect to step 306, the requested data may be provided to the second application (where the second application is separate from the first application) by copying the requested data to another storage location and providing the second application (and/or a machine learned model of the second application) with read or read/write access to the another storage location. Accordingly, both the first application and the second application may access the requested data at the same time, while reducing the chance that changes and/or access to the data by the other application will interfere with processes of an application. In some examples, when providing access to the requested data, a portion of data at the storage location may be copied to the another storage location.

Figure 4:
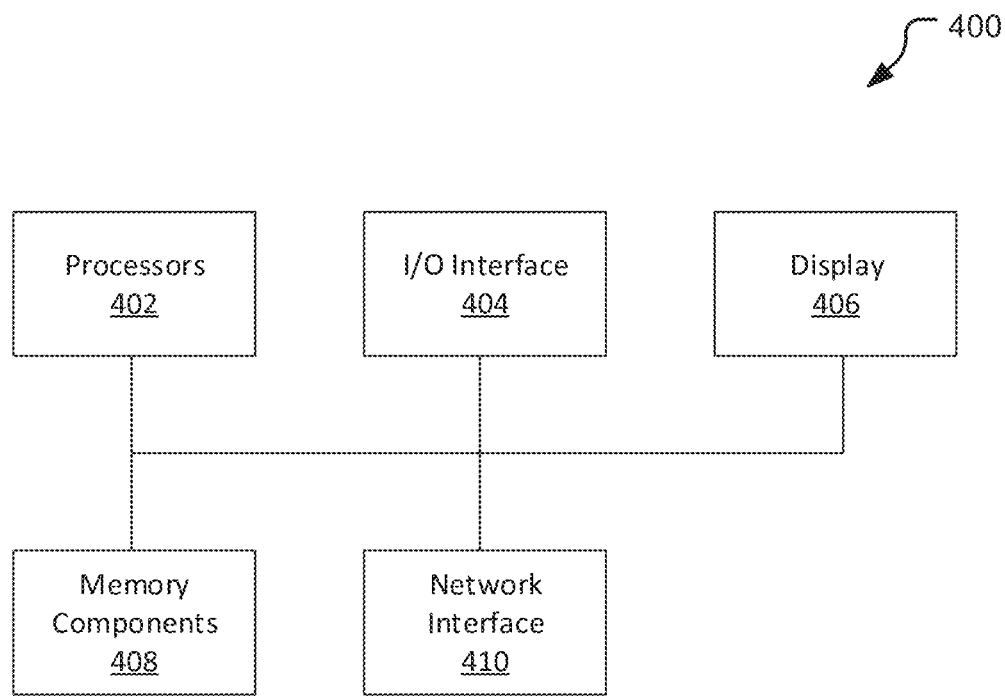
FIG. 4 is an example computing system, in accordance with examples described herein.

Now turning to FIG. 4, FIG. 4 is a schematic diagram of an example computing system 400 for implementing various embodiments in the examples described herein. Computing system 400 may be used to implement the computing device 104, the user devices (not shown), or it may be integrated into one or more of the components of system 100, computing device 104 and/or user devices (not shown). Computing system 400 may be used to implement or execute one or more of the components or operations disclosed in FIGS. 1-2. In FIG. 4, computing system 400 may include one or more processors 402, an input/output (I/O) interface 404, a display 406, one or more memory components 408, and a network interface 410. Each of the various components may be in communication with one another through one or more buses or communication networks, such as wired or wireless networks.

Processors 402 may be implemented using generally any type of electronic device capable of processing, receiving, and/or transmitting instructions. For example, processors 402 may include or be implemented by a central processing unit, microprocessor, processor, microcontroller, or programmable logic components (e.g., FPGAs). Additionally, it should be noted that some components of computing system 400 may be controlled by a first processor and other components may be controlled by a second processor, where the first and second processors may or may not be in communication with each other.

Memory components 408 may be used by computing system 400 to store instructions, such as executable instructions discussed herein, for the processors 402, as well as to store data, such dataset data, machine learned model data, and the like. Memory components 408 may be, for example, magneto-optical storage, read-only memory, random access memory, erasable programmable memory, flash memory, or a combination of one or more types of memory components.

Display 406 provides a trained machine learned model, an output of a machine learned model after running an evaluation set, or relevant outputs and/or data, to a user of computing device 104 of FIG. 1 or a user of a user device described herein (not shown). Optionally, display 406 may act as an input element to enable a user of computing device 104 to manually alter the data used in the training and/or evaluating, the model trained, or the predicted output of the model, or any other component in system 100 as described in the present disclosure. Display 406 may be a liquid crystal display, plasma display, organic light-emitting diode display, and/or other suitable display. In embodiments where display 406 is used as an input, display 406 may include one or more touch or input sensors, such as capacitive touch sensors, a resistive grid, or the like.

The I/O interface 404 allows a user to enter data into the computing system 400, as well as provides an input/output for the computing system 400 to communicate with other devices or services, computing device 108 and user devices (not shown) of FIG. 1. I/O interface 404 can include one or more input buttons, touch pads, track pads, mice, keyboards, audio inputs (e.g., microphones), audio outputs (e.g., speakers), and so on.

Network interface 410 provides communication to and from the computing system 400 to other devices. For example, network interface 410 may allow computing device 104 to communicate with data stores 106 or user devices (not shown) through a communication network, such as network 102 of FIG. 1. Network interface 410 includes one or more communication protocols, such as, but not limited to Wi-Fi, Ethernet, Bluetooth, cellular data networks, and so on. Network interface 410 may also include one or more hardwired components, such as a Universal Serial Bus (USB) cable, or the like. The configuration of network interface 410 depends on the types of communication desired and may be modified to communicate via Wi-Fi, Bluetooth, and so on.

Figure 5:
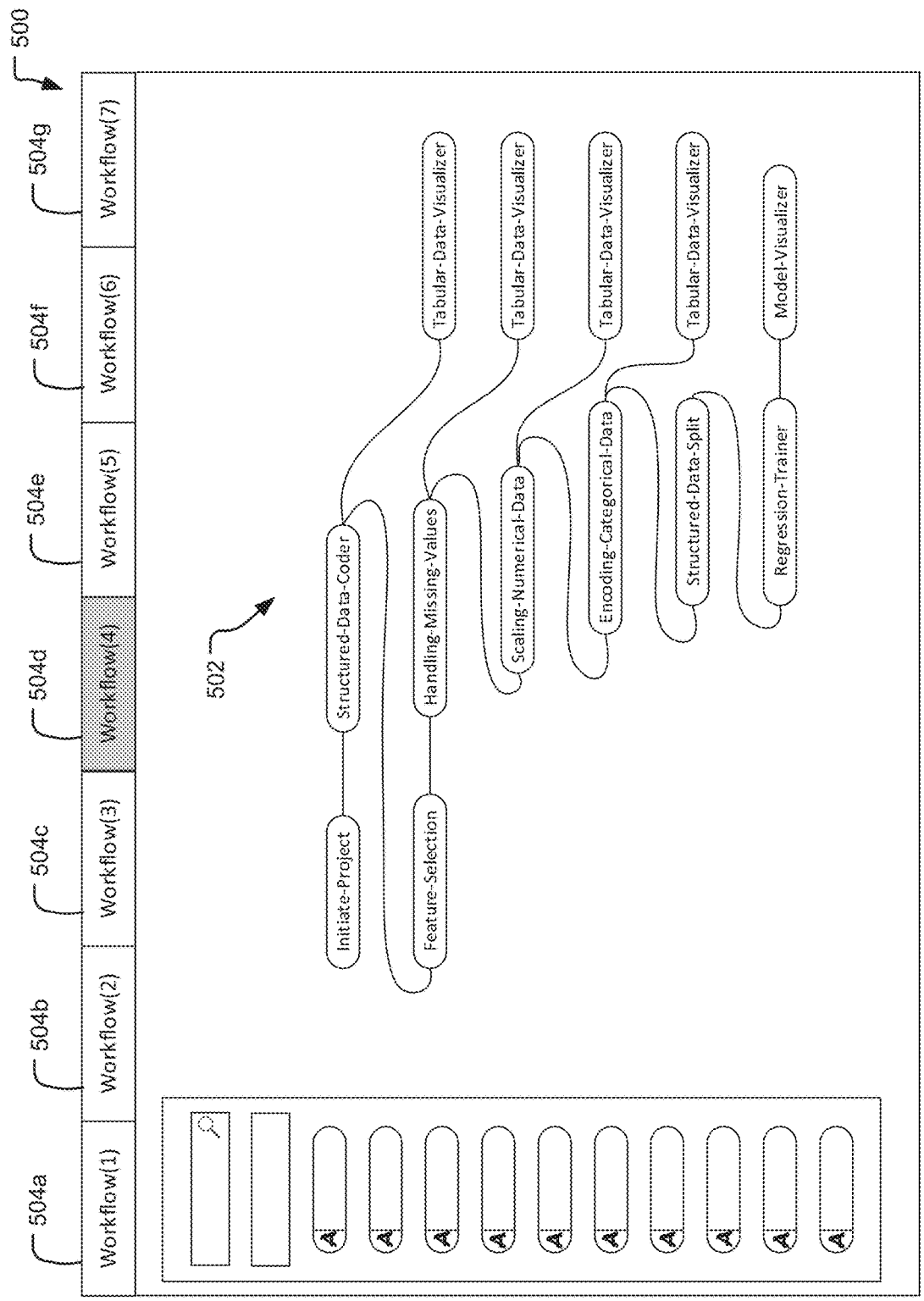
FIG. 5 shows a user interface including a workflow including various machine learned models in accordance with examples described herein.

Turning to FIG. 5, FIG. 5 shows a user interface 500 including a workflow 502 including various machine learned models. The user interface 500 includes tabs 504*a*-504*g* for other workflows, which may also include various machine learned models. Generally, each workflow may execute at the application layer 108 of the computing device 104. In some examples, workflows represented by tabs 504*a*-504*g* may execute simultaneously, such that machine learned models from several workflows may request access to data at one time. Generally, if two machine learned models from the same workflow request access to the data, the models may be granted access at the same time by providing read or read/write access to a storage location of the data. When executing in the same workflow, the two machine learned models may be unlikely to interfere with the other's access to the data at the storage location. However, as the workflows may execute independently of one another, when machine learned models from two different workflows request access to the same data, one machine learned model may be given access to the data at a second storage location, where the data is copied to the second storage location.

In accordance with the above, a system may be provided which allows for more efficient access to and sharing of large amounts of data, such as training data, between machine learning models. As several machine learning models may work in tandem or sequentially to perform various tasks, passing data between one another, access to a common memory location with stored data may reduce processing time. Further, because the data is stored in a platform and programming language agnostic manner, fewer copies of the data are made, saving storage space and resources. Such a programming language agnostic system may further simplify development by allowing for use of existing machine learning models, even where the models are written in different programming languages. In various examples, such a system may be used to perform various functions and make various types of predictions. For example, the accessed data may be historical commercial flight data utilized by and/or used to train one or more machine learning models to predict future flight pricing, timing, and the like. In another example, the accessed data may be historical weather data utilized by and/or used to train one or more machine learning models to predict weather patterns for various applications. Accordingly, the disclosed system may allow for increased use of machine learning models to make such predictions due to increased efficiency and ease of implementation.

The description of certain embodiments included herein is merely exemplary in nature and is in no way intended to limit the scope of the disclosure or its applications or uses. In the included detailed description of embodiments of the present systems and methods, reference is made to the accompanying drawings which form a part hereof, and which are shown by way of illustration specific to embodiments in which the described systems and methods may be practiced. These embodiments are described in sufficient detail to enable those skilled in the art to practice presently disclosed systems and methods, and it is to be understood that other embodiments may be utilized, and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The included detailed description is therefore not to be taken in a limiting sense, and the scope of the disclosure is defined only by the appended claims.

From the foregoing it will be appreciated that, although specific embodiments of the invention have been described herein for purposes of illustration, various modifications may be made without deviating from the spirit and scope of the invention.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice.

As used herein and unless otherwise indicated, the terms "a" and "an" are taken to mean "one", "at least one" or "one or more". Unless otherwise required by context, singular terms used herein shall include pluralities and plural terms shall include the singular.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. A computer implemented method comprising:
translating, by a mapping layer of a computing device in communication with a storage location, a first request to directly access data at a first memory block at the storage location from a first format associated with a first programming language to a second format, wherein the first request is received from a first machine learned model using the first programming language;
providing access to the data at the first memory block to the first machine learned model, wherein access to the first memory block is provided to the first machine learned model in the first programming language;
translating, by the mapping layer, a second request to directly access the data at the first memory block from a third format associated with a second programming language to the second format, wherein the second request is received from a second machine learned model using the second programming language; and
providing access to the data at the first memory block to the second machine learned model, wherein access to the data at the first memory block is provided to the second machine learned model in the second programming language.

2. The computer implemented method of claim 1, wherein providing access to the first memory block to the first machine learned model in the first programming language comprises translating a data type of data stored at the first memory block.

3. The computer implemented method of claim 1, wherein providing access to the first memory block to the first machine learned model comprises providing at least read access to the first memory block to the first machine learned model.

4. The computer implemented method of claim 3, wherein providing access to the data at the first memory block to the second machine learned model comprises copying the data at the first memory block to a second memory block and providing at least read access to the second memory block to the second machine learned model.

5. A computer implemented method comprising:
receiving a plurality of incoming data, wherein each of the plurality of incoming data includes a corresponding data type;
preprocessing the plurality of incoming data to create a dataset;
mapping the dataset to one or more corresponding memory blocks;
storing each memory block of the one or more corresponding memory blocks to a storage location of the plurality of storage locations;
translating, by a mapping layer of a computing device in communication with the storage location, a first request to directly access the dataset at the one or more corresponding memory blocks from a first format associated with a first programming language to a second format, wherein the request is received from a first machine learned model using the first programming language;
translating, by the mapping layer, a second request to directly access the dataset at the one or more corresponding memory blocks from a third format associated with a second programming language to the second format, wherein the request is received from a second machine learned model using the second programming language; and
providing access to the dataset at the one or more corresponding memory blocks to the first machine learning model and the second machine learning model, based on a determination that the first machine learning model and the second machine learning model have one or more dependencies on one another, wherein providing access to the dataset to the first machine learning model and the second machine learning model comprises providing access to the first machine learning model in the first programming language and providing access to the second machine learning model in the second programming language.

6. The computer implemented method of claim 5, wherein storing each memory block of the one or more corresponding memory blocks comprises storing the dataset at the one or more corresponding memory blocks as data type agnostic data.

7. At least one non-transitory computer-readable storage medium including instructions that when executed by a processor, cause the processor to:
map, based at least in part on one or more configurable parameters, each data of a plurality of incoming data to a corresponding memory block of a storage location;
store, based at least in part on the one or more configurable parameters, each memory block to a storage location of a plurality of storage locations;
translate, by a mapping layer of the processor, a first access request to directly access data at a memory block of the storage location from a first format associated with a first programming language to a second format;
in response to receiving the first access request from a first machine learned model, providing access to the first memory block;
translate, by the mapping layer, a second access request to directly access the data at the memory block from a third format associated with a second programming language to the second format; and
in response to receiving the second access request from a second machine learned model, providing access to the memory block,
wherein access to the memory block is provided to the first machine learned model in the first programming language, and
wherein access to the memory block is provided to the second machine learned model in the second programming language.

8. The at least one computer-readable storage medium of claim 7, wherein the instructions, when executed by the processor, further cause the processor to:
perform a scoring algorithm on each data of the plurality of incoming data, wherein the scoring algorithm determines a tier for each data of the plurality of incoming data, and wherein the scoring algorithm comprises a sliding window algorithm, a cached data algorithm, a Pearson correlation algorithm, a chi-squared algorithm, a recursive feature elimination algorithm, a lasso algorithm, a tree-based algorithm, or combinations thereof.

9. The at least one computer-readable storage medium of claim 7, wherein the instructions, when executed by the processor, further cause the processor to:
train, based at least on receiving the memory block in response to the first access request, the first machine learned model using the memory block, wherein receiving the memory block occurs in real time, near-real time, or combinations thereof; and
train, based at least on receiving the memory block in response to the second access request, the second machine learned model using the memory block, wherein receiving the second memory block occurs in real time, near-real time, or combinations thereof.

10. The at least one computer-readable storage medium of claim 7, wherein the first programming language, the second programming language, or combinations thereof, comprise python, javascript, R, hypertext processor (PHP), practical extraction and report language (PERL), Ruby, C, C++, or combinations thereof.

11. The at least one computer-readable storage medium of claim 7, wherein the instructions, when executed by the processor, further cause the processor to:
in response to receiving a third access request to access the memory block in a third programming language from a third machine learned model, providing access to the memory block, wherein access to the memory block is provided to the third machine learned model in the third programming language.

12. The at least one computer-readable storage medium of claim 7, wherein the instructions, when executed by the processor, further cause the processor to:

in response to receiving a fourth access request to access a second memory block in the first programming language from the first machine learned model, providing access to the second memory block, wherein access to the second memory block is provided to the first machine learned model in the first programming language; and evaluating the first machine learned model using the second memory block, wherein receiving the second memory block occurs in real time, near-real time, or combinations thereof.

13. The at least one computer-readable storage medium of claim 12, wherein the memory block comprises training data for training a machine learned model, and wherein the second memory block comprises evaluation data for evaluating the machine learned model, and wherein the first machine learned model is trained based on supervised learning, unsupervised learning, or combinations thereof.

14. The at least one computer-readable storage medium of claim 7, wherein the one or more configurable parameters include a priority rank determination for each storage location of the plurality of storage locations.

15. The computer implemented method of claim 1, wherein the first programming language, the second programming language, or combinations thereof, comprise python, javascript, R, hypertext processor (PHP), practical extraction and report language (PERL), Ruby, C, C++, or combinations thereof.

16. The computer implemented method of claim 5, wherein the first programming language, the second programming language, or combinations thereof, comprise python, javascript, R, hypertext processor (PHP), practical extraction and report language (PERL), Ruby, C, C++, or combinations thereof.

17. The computer implemented method of claim 5, wherein storing each memory block of the one or more memory blocks to a storage location of the plurality of storage locations comprises storing each memory block of the one or more memory blocks to a storage location of the plurality of storage locations based on one or more configurable parameters.

\* \* \* \* \*